US009132486B2

(12) United States Patent
Pecastaing et al.

(10) Patent No.: US 9,132,486 B2
(45) Date of Patent: Sep. 15, 2015

(54) TAPPING UNIT WITH PROTECTION MEANS

(75) Inventors: Matthieu Pecastaing, Groisy (FR); Julien Tissot, Groisy (FR)

(73) Assignee: PRONIC, Marignier (FR)

( * ) Notice: Subject to any disclaimer, the term of this patent is extended or adjusted under 35 U.S.C. 154(b) by 716 days.

(21) Appl. No.: 13/508,389

(22) PCT Filed: Oct. 22, 2010

(86) PCT No.: PCT/IB2010/054805
§ 371 (c)(1),
(2), (4) Date: May 7, 2012

(87) PCT Pub. No.: WO2011/058468
PCT Pub. Date: May 19, 2011

(65) Prior Publication Data

US 2012/0237308 A1 Sep. 20, 2012

(30) Foreign Application Priority Data

Nov. 13, 2009 (FR) ..................................... 09 58032

(51) Int. Cl.
*B23G 3/00* (2006.01)
*B23G 3/02* (2006.01)
*B23B 31/08* (2006.01)
*B23G 1/18* (2006.01)

(52) U.S. Cl.
CPC ................ *B23B 31/086* (2013.01); *B23G 1/18* (2013.01); *B23G 3/005* (2013.01); *B23G 2240/52* (2013.01); *Y10T 408/68* (2015.01); *Y10T 408/70* (2015.01); *Y10T 408/9048* (2015.01)

(58) Field of Classification Search
CPC .. B23G 3/005; B23G 2240/52; Y10T 408/16; Y10T 408/165; Y10T 408/17; Y10T 408/173; Y10T 408/68; Y10T 408/70; Y10T 408/73; Y10T 408/75; Y10T 408/665
USPC ......... 408/8–10, 12, 138, 139, 141, 142, 127; 72/340, 341
See application file for complete search history.

(56) References Cited

U.S. PATENT DOCUMENTS 578,483 A * 3/1897 Errington ...................... 408/133
1,010,743 A * 12/1911 Durrenberger ................ 408/133
1,628,184 A * 5/1927 Pestel ........................ 192/56.56

(Continued)

FOREIGN PATENT DOCUMENTS

DE 19729263 A1 1/1999
EP 1238737 A1 9/2002

(Continued)

*Primary Examiner* — Sunil K Singh
*Assistant Examiner* — Ryan Rufo
(74) *Attorney, Agent, or Firm* — William H. Eilberg

(57) ABSTRACT

A tapping unit (1) includes a protection device (12) for permitting an axial retraction movement of a master screw (4) towards the interior of a casing (2) from a reference position into a first proximal backward position with a first defined penetration stroke during which a first elastic return device (13) constantly returns the master screw (4) to its reference position. The protection device (12) furthermore permits an additional axial retraction movement of the master screw (4) towards the interior of the casing (2) from the proximal backward position into a second proximal backward position with a defined penetration stroke during which the master screw (4) is no longer returned towards the exterior of the casing (2).

17 Claims, 7 Drawing Sheets

(56) References Cited

U.S. PATENT DOCUMENTS

| | | | | | |
|---|---|---|---|---|---|
| 2,684,491 | A * | 7/1954 | Roddick | ..................... | 408/139 |
| 5,173,015 | A * | 12/1992 | Maynard | ..................... | 408/137 |
| 2004/0009044 | A1 * | 1/2004 | Chun et al. | ..................... | 408/124 |

FOREIGN PATENT DOCUMENTS

| | | | |
|---|---|---|---|
| FR | 2124172 | | 9/1972 |
| FR | 2177211 | | 11/1973 |
| FR | 2798308 | A1 | 3/2001 |

* cited by examiner

TAPPING UNIT WITH PROTECTION MEANS

TECHNICAL FIELD OF THE INVENTION

The present invention concerns a tapping unit intended to be mounted on a machine tool. The invention notably concerns a tapping unit that can be used on a machine tool for carrying out one or more workpiece machining processes continuously.

For example, a tapping unit of this kind may be used on a workpiece shaping press to produce one or more screwthreads on the workpiece.

A tapping unit known in the art comprises:

a casing intended to be fixed in front of a workpiece to be machined on a support of a machine tool such as a press, and having an interior housing, a master template, including a bush with a threaded bore, axially engaged to slide inside the interior housing of the casing and retained in rotation by locking means, a tap-holder, including means for receiving and retaining a tap, provided with a threaded section functionally engaged in the threaded bore of the master template, and including a driving section, a drive shaft rotatably mounted in the casing, including a bore receiving in longitudinal sliding the drive section of the tap-holder, and loaded in rotation by a mechanical transmission actuated by a motor.

From the documents EP 1 238 737 and DE 197 29 263 there is known a master template tapping unit slidably engaged in the axial direction in the casing, further including protection means for allowing, if excessive axial thrust is exerted on the tap by the workpiece to be machined, retrograde axial movement of the master template toward the interior of the casing from a reference position to a first proximal retraction position over a first particular penetration stroke during which first spring-loading means continuously urge the master template toward its reference position.

A tapping unit of this kind enables limitation of the risk of the tap breaking if the tap is not in perfect corresponding relationship with the hole to be tapped.

However, to effect tapping correctly, the first spring-loading means must continuously retain the master template in its reference position with a high force, for example around approximately 600 N. The space available being very limited, the first spring-loading means have a relatively high stiffness to ensure this retention.

As a result of this the first penetration stroke is of very limited amplitude relative to the length of the spring-loading means. Beyond a certain penetration stroke, the return force exerted by the first spring-loading means would become so great that either the tap would be broken or the tap would be forced to penetrate into the hole to be tapped with an incorrect orientation, for example a slightly oblique orientation, which would lead to the production of a defective thread and/or damage to the tap, which defects might not be detected. There is therefore after all a high risk of breaking the tap and/or a risk of producing numerous defective threads without this even being noticed.

Finally, if the tap is not broken but comes to be immobilized in rotation through bearing against the workpiece to be tapped, mechanical elements of the means driving rotation of the tap may be damaged and/or broken.

SUMMARY OF THE INVENTION

The present invention aims to remedy the above drawbacks of the prior art and more particularly aims to design a tapping unit with protection means enabling a greater axial retraction movement whilst efficaciously limiting the risk of breaking the tap and/or of malformed threads and/or of damaging the means driving rotation of the tap.

To achieve the above and other objects, the invention proposes a tapping unit comprising:

a casing intended to be fixed in front of a workpiece to be machined on a support of a machine tool such as a press, and having an interior housing, a master template, including a bush with a threaded bore, axially engaged to slide inside the interior housing of the casing and retained in rotation by locking means, a tap-holder, including means for receiving and retaining a tap, provided with a threaded section functionally engaged in the threaded bore of the master template, and including a driving section, a rotatably mounted drive shaft, including a bore receiving in longitudinal sliding the drive section of the tap-holder, and loaded in rotation by a mechanical transmission actuated by a motor, protection means for allowing axial retraction movement of the master template toward the interior of the casing from a reference position to a first proximal retraction position over a first particular penetration stroke over which first spring-loading means continuously urge the master template toward its reference position, wherein the protection means further allow a supplementary retraction axial movement of the master template toward the interior of the casing from the first proximal retraction position to a second proximal retraction position over a second particular penetration stroke over which the master template is no longer urged toward the exterior of the casing.

Such protection means allow, beyond the first penetration stroke, freeing of the tap from any load exerted by the first spring-loading means. The master template and the tap may thus be freely retracted toward the interior of the casing over a second penetration stroke, which may be very long, without the tap being subjected to loads liable to break it or to force it to engage incorrectly in a non-existent hole to be tapped or a hole incorrectly centered relative to the tap.

Thus this efficaciously limits the risk of breaking the tap. Furthermore, the production of defective threads is prevented and subsequent reworking of the workpieces to be tapped is enabled, which limits the number of defective workpieces produced.

In practice, means may advantageously be provided for disengaging the first spring-loading means when the master template reaches the first proximal retraction position.

The protection means may advantageously comprise:

at least one radial female housing provided in the bush of the master template and opening radially onto its exterior surface, at least one locking element mounted to slide radially in a transverse passage immobile relative to the casing, movable between an engagement position in which said locking element is partially engaged in said radial female housing whilst remaining guided in said transverse passage and a release position in which said locking element is outside said radial female housing, the first spring-loading means continuously urging said locking element directly or indirectly toward its engagement position.

Thus the reference position is determined by the locking means when they are engaged in the radial female housing. Such a system also has the advantage of being easily reversible to return the master template to its reference position, and this only by deliberate action of an operator.

Preferably, it can be provided that:

the locking element may be a spherical ball, the transverse passage may include a portion with a first oblique slope relative to the axial direction of movement of the tap, the first spring-loading means may urge the locking element in the axial direction against the portion with the first oblique slope, the portion with the first oblique slope may be oriented in such a manner as to move the locking element radially into an engagement position as a result of the axial loading of the first spring-loading means.

Such an arrangement enables the axial force produced by the first spring-loading means to be transformed into a radial force. The space radially available is thus too limited to accommodate first spring-loading means capable of a satisfactory return force.

Advantageously, it can be provided that:

the radial female housing may extend in the axial direction of movement of the tap between a proximal end and a distal end and may have, at its distal end, a second slope oblique relative to the axial direction of movement of the tap, the second oblique slope may be oriented in such a manner as to move the locking element out of the radial female housing when the master template is moved toward the first proximal retraction position.

The second oblique slope thus enables progressive extraction of the locking member from the radial female housing until it reaches the first proximal retraction position, after which the locking element leaves the radial female housing, disengaging or inhibiting the first spring-loading means.

The reference position and the second proximal retraction position may advantageously be approximately 20 mm apart. Such a distance substantially corresponds to the majority of the length of the tapping strokes that are effected. Such a distance separating the reference position and the second proximal retraction position makes it certain that the tap will never be loaded to breaking point in most of the threads to be produced.

The protection means may preferably allow limited forward axial movement of the master template toward the exterior of the casing against second spring-loading means from the reference position to a distal forward position over a particular forward stroke.

This enables the tap to follow any unintentional movements of the workpiece to be tapped and/or to avoid breaking the tap when it is withdrawn out of the tapped hole.

The radial female housing may advantageously be elongate in the axial direction of movement of the tap in such a manner as to allow an axial movement stroke of the locking element in the radial female housing, preferably of approximately 2 mm length.

Advantageously, it can be provided that:

the radial female housing may have, at its proximal end, a third slope oblique relative to the axial direction of movement of the tap, the third oblique slope may be oriented in such a manner that, in the distal forward position, it cooperates with the first oblique slope to lock the locking element in the engagement position.

Thus the protection means protect the tap as much during a retraction movement as during a forward movement of the master template. The system is then very compact.

The tapping unit may preferably include means for detecting movement of the master template beyond the first proximal retraction position.

The detection means may produce a signal warning the operator of the abnormal operation of the tapping unit in order for the operator to correct the problem as soon as possible. Alternatively or in addition to this, the detection means may produce a signal enabling stopping of the tapping unit and the production line in order to prevent the production of defective workpieces.

BRIEF DESCRIPTION OF THE DRAWINGS

Other objects, features and advantages of the present invention will emerge from the following description of particular embodiments given with reference to the appended figures, in which.

DESCRIPTION OF PREFERRED EMBODIMENTS

A tapping unit 1 of one embodiment of the invention is shown in FIGS. 1 to 6.

Figure 1:
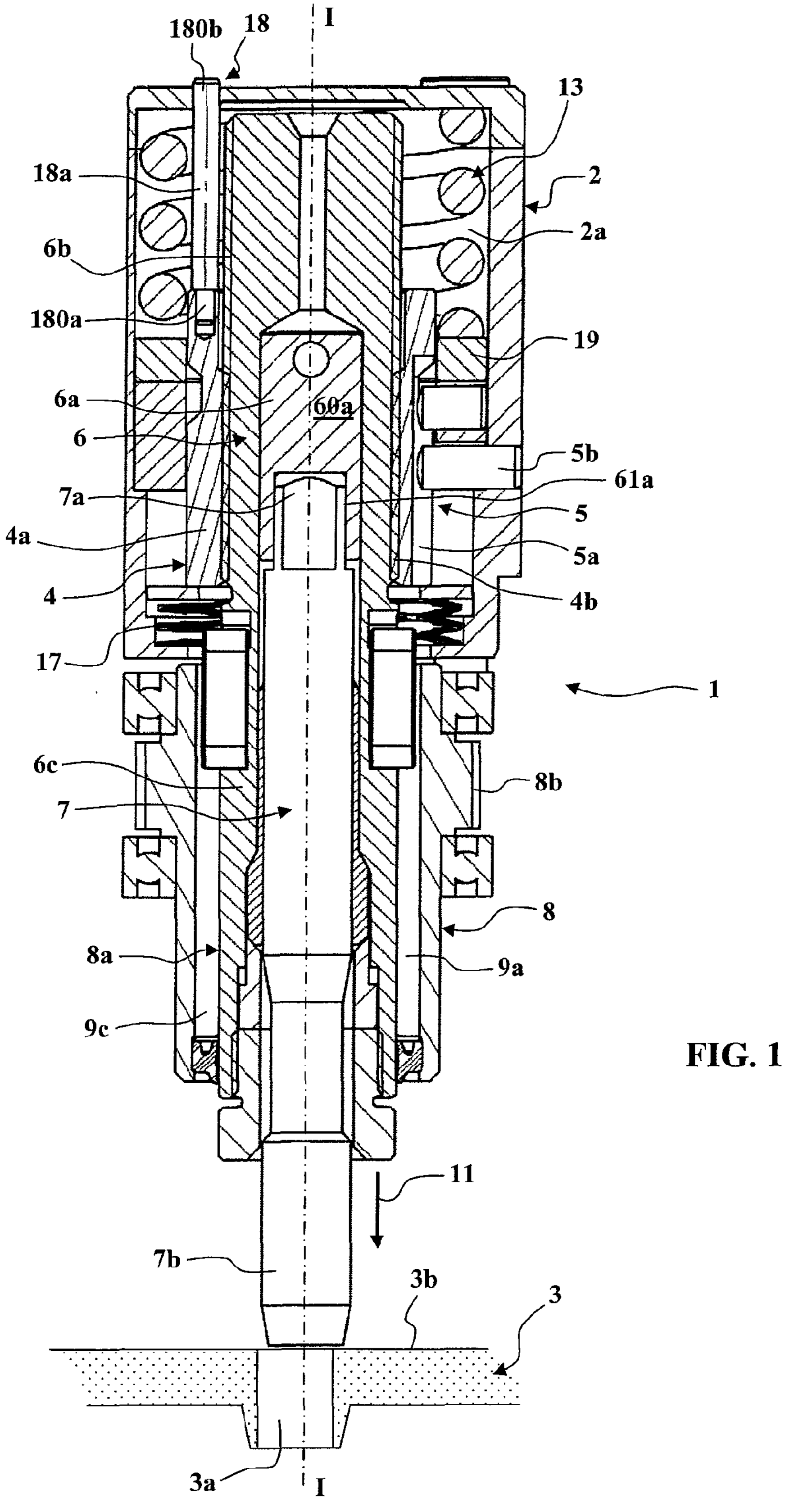
FIG. 1 is a sectional view of a tapping unit of one embodiment of the invention in a first diametral direction, the master template being in its reference position.

It is seen more particularly in FIG. 1 that the tapping unit 1 comprises:

a casing 2 intended to be fixed in front of a workpiece 3 to be machined on a support of a machine tool such as a press (not shown), and having an interior housing 2*a*, a master template 4, including a bush 4*a* with a threaded bore 4*b*, axially engaged to slide inside the interior housing 2*a* of the casing 2 and retained in rotation by locking means 5, a tap-holder 6, including means 6*a* for receiving and retaining a tap 7, provided with a threaded section 6*b* functionally engaged in the threaded bore 4*b* of the master template 4, and including a driving section 6*c*, a rotatably mounted drive shaft 8, including a bore 8*a* receiving in longitudinal sliding the drive section 6*c* of the tap-holder 6, and loaded in rotation by a mechanical transmission (not shown) actuated by a motor.

It is seen more particularly in FIG. 1 that the means 5 for blocking rotation of the master template 4 comprise a longitudinal groove 5*a* extending in an axial direction I-I, cooperating with a transverse pin 5*b* engaged in the casing 2, and penetrating into the longitudinal groove 5*a*.

The means 6*a* for receiving and retaining the tap 7 include a bush 60*a* engaged and blocked in rotation in the axial direction I-I in the tap-holder 6. The bush 60*a* includes an imprint 61*a* receiving the proximal end 7*a* of the tap 7 and driving it in rotation by virtue of cooperating shapes. Here the imprint 61*a* is square, but it may have a different shape to receive taps 7 conforming to some other standard.

Figure 8:
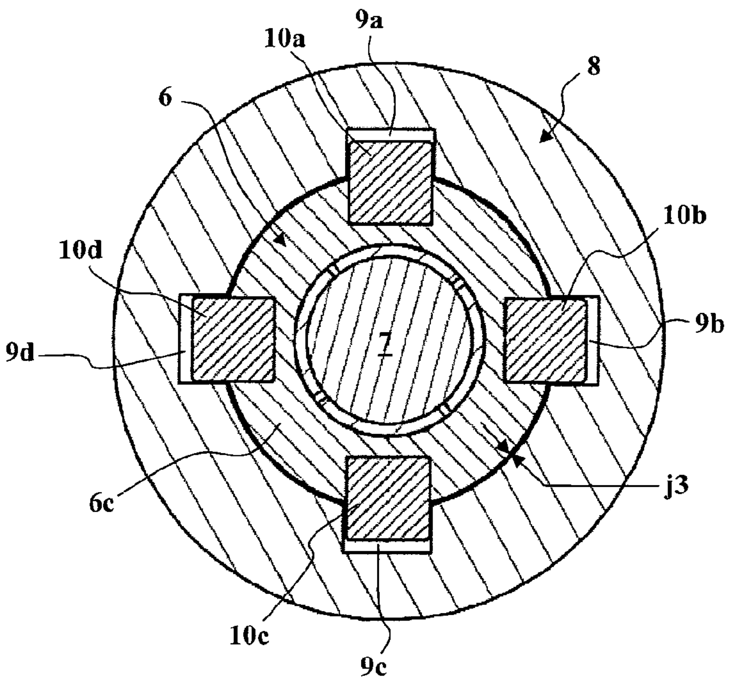
FIG. 8 is a view in cross section of the FIG. 2 tapping unit.

It is seen more particularly in FIGS. 1 to 6 that the drive shaft 8 includes external teeth 8*b* in order to be driven in rotation in the axial direction I-I by the mechanical transmission. The drive shaft 8 includes four longitudinal grooves 9*a* to 9*d* in which may slide longitudinally in the axial direction I-I four keys 10*a* to 10*d* fastened to the drive section 6*c* of the tap-holder 6 (FIG. 8).

In normal operation of the tapping unit 1, the drive shaft 8 is loaded in rotation in the axial direction I-I, simultaneously driving, via the keys 10*a* to 10*d*, the tap-holder 6. The master template 4 is then immobile in a reference position shown in FIGS. 1 and 2. Because of the rotation of the tap-holder 6 and the threaded connection between the tap-holder 6 and the master template 4, the tap-holder 6 is moved with a movement in translation shown by the arrow 11. The tap 7 thus produces a thread in the workpiece 3 to be machined by virtue of being screwed into the hole 3*a* to be tapped.

If the workpiece 3 to be machined has a hole 3*a* to be tapped that is too eccentric relative to the axial direction I-I for the tap 7 to penetrate therein, the tap 7 abuts against the upper surface 3*b* of the workpiece 3 to be machined and is prevented from moving forward in the movement shown by the arrow 11.

To prevent the tap 7 breaking, protection means 12 (more particularly visible in FIG. 2) allow axial retraction movement of the master template 4 toward the interior of the casing 2 from the reference position (FIGS. 1 and 2) to a first proximal retraction position (FIG. 3) over a first particular penetration stroke C1 over which first-loading means 13 continuously urge the master template 4 toward its reference position.

Figure 4:
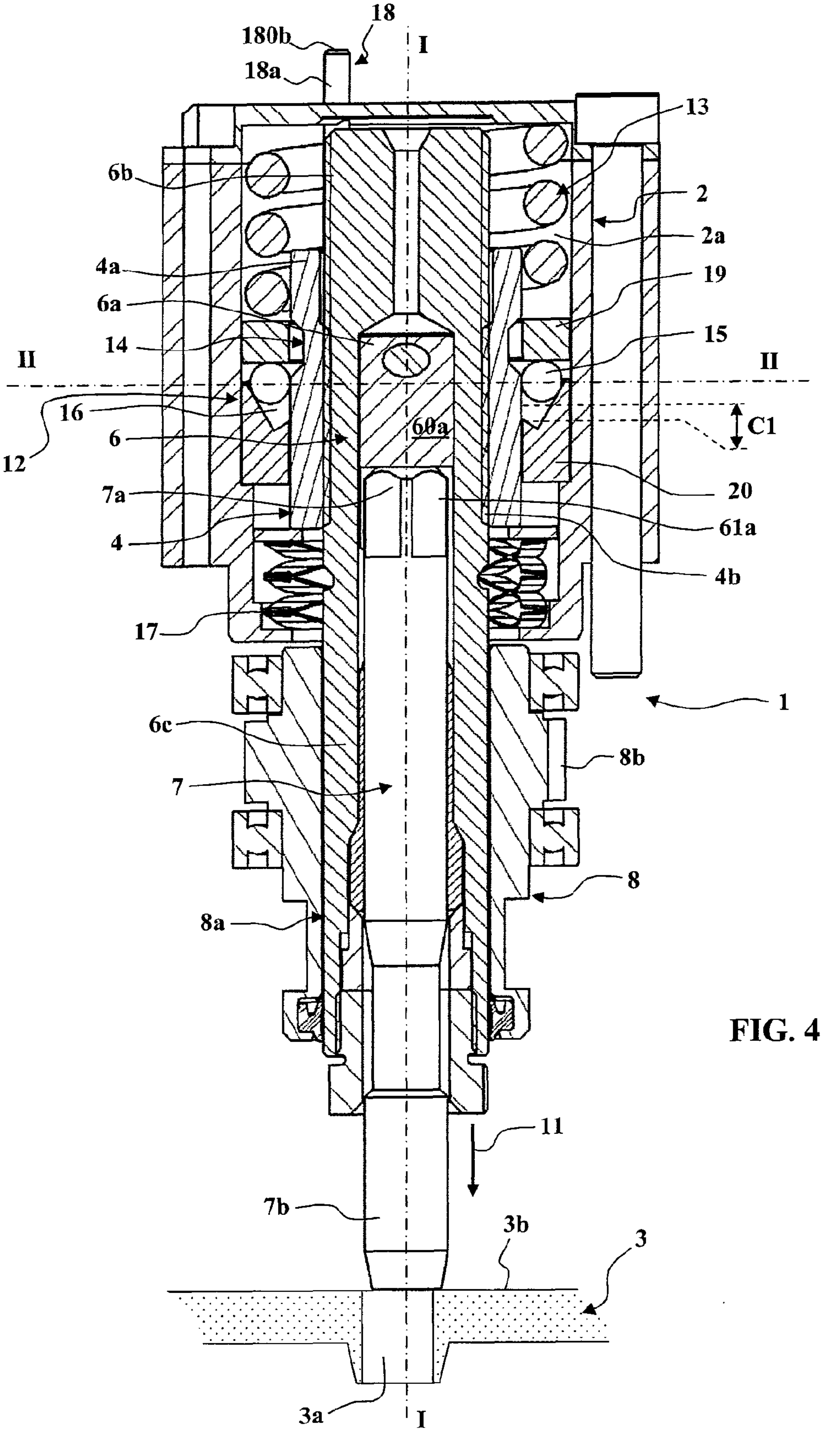
FIG. 4 is a sectional view of the FIG. 1 tapping unit in the second diametral direction, the master template being in the process of moving beyond the first proximal retraction position.
Figure 5:
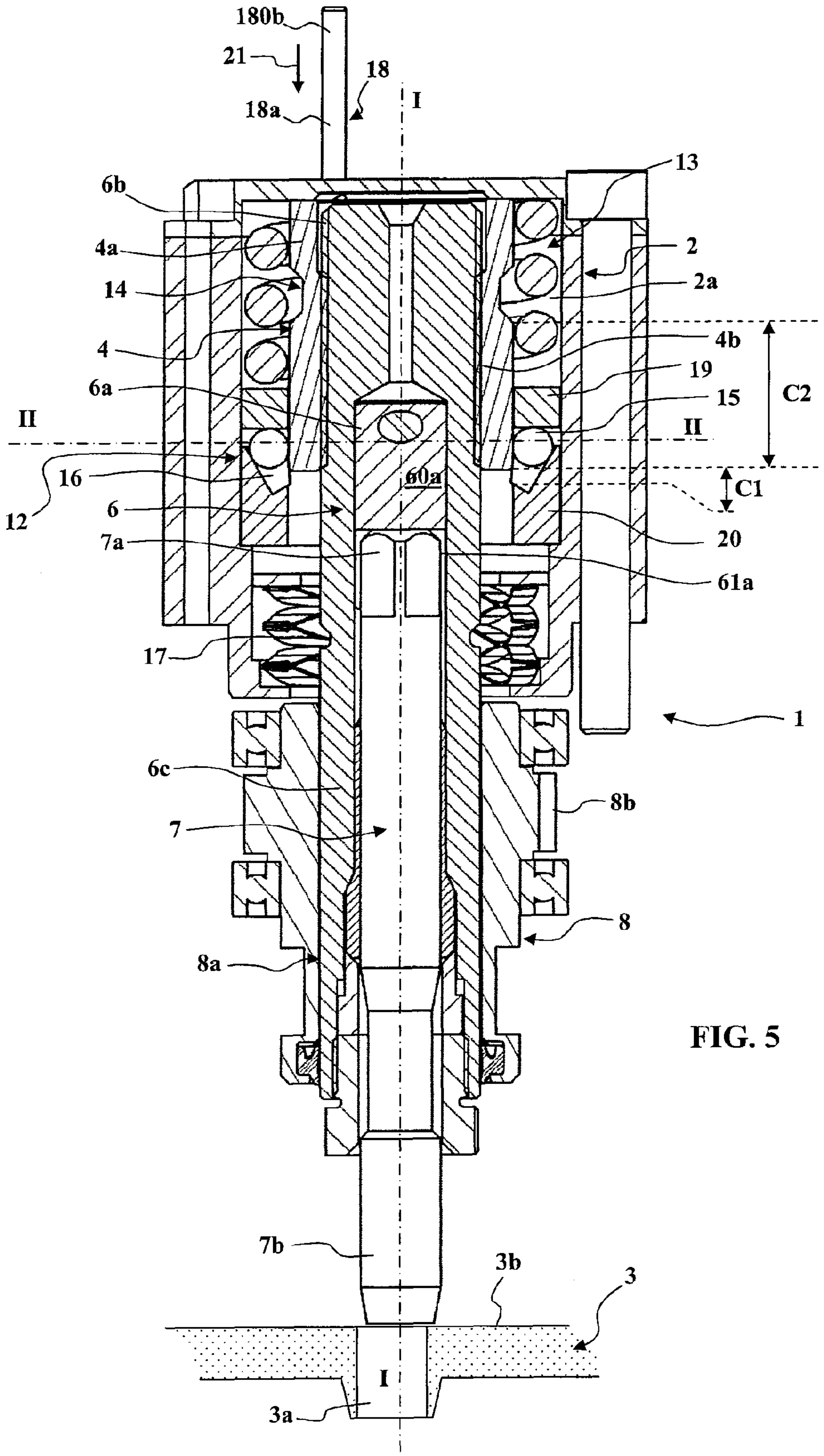
FIG. 5 is a sectional view of the FIG. 1 tapping unit in the second diametral direction, the master template being in its second proximal retraction position.

It is seen more particularly in FIGS. 4 and 5 that the protection means 12 further allow a supplementary retraction axial movement of the master template 4 toward the interior of the casing 2 from the first proximal retraction position (FIG. 3) to a second proximal retraction position (FIG. 5) over a second particular penetration stroke C2 over which the master template 4 is no longer urged toward the outside of the casing 2.

Figure 2:
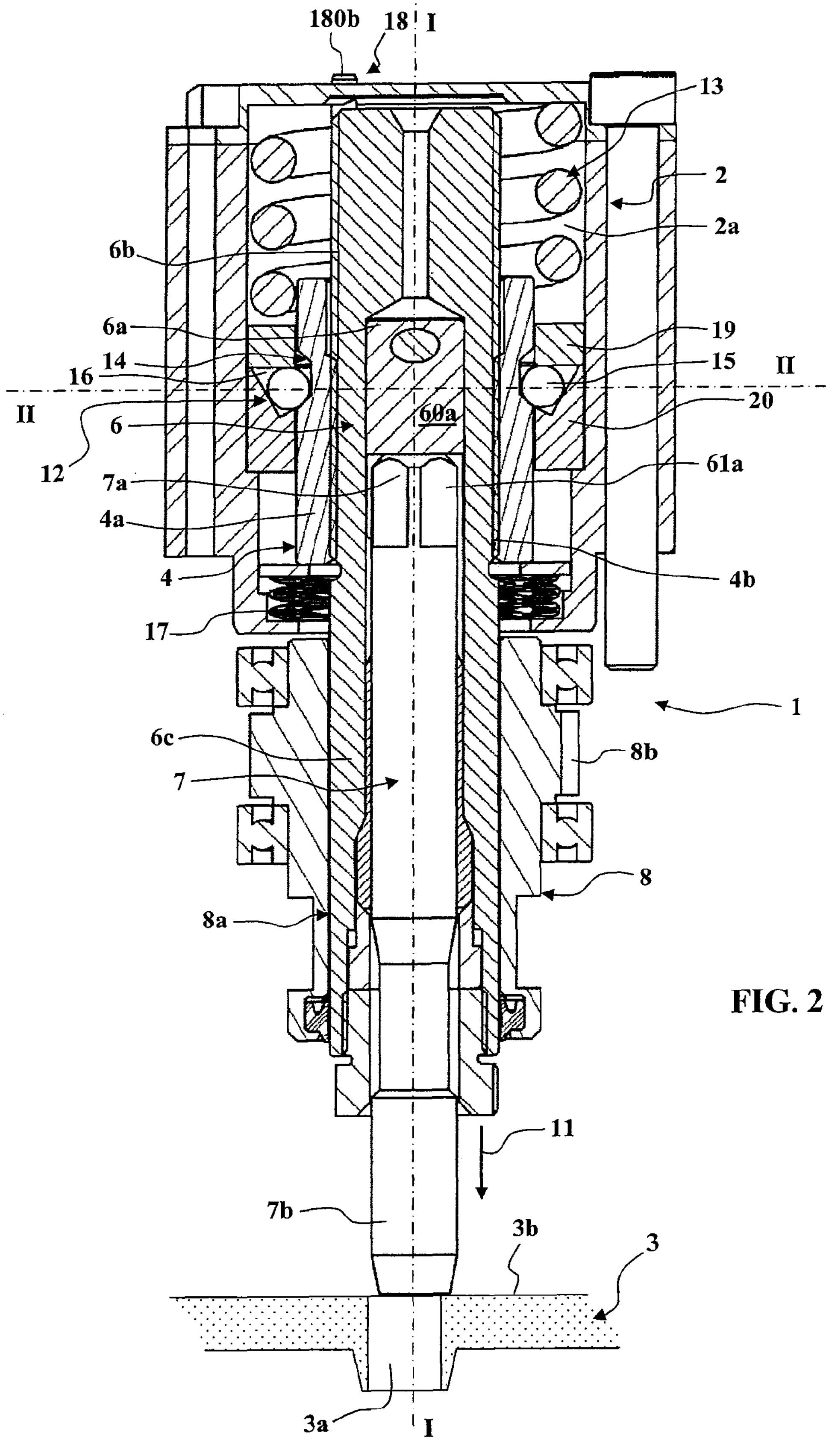
FIG. 2 is a sectional view of the FIG. 1 tapping unit in a second diametral direction, the master template being in its reference position.
Figure 3:
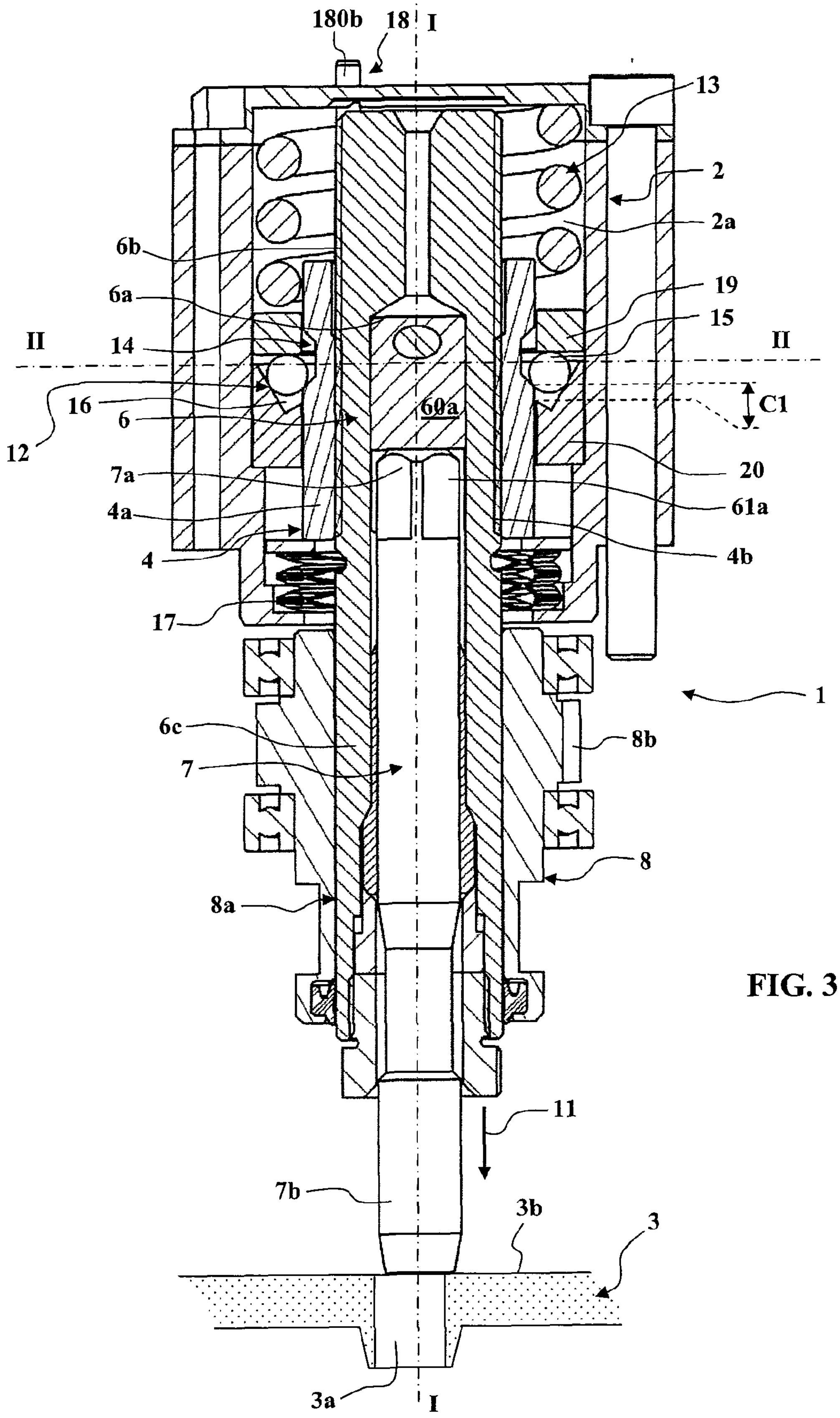
FIG. 3 is a sectional view of the FIG. 1 tapping unit in the second diametral direction, the master template being in its first proximal retraction position.

It is seen more particularly in FIGS. 2 to 6 that the protection means 12 comprise:

- a plurality of radial female housings 14 provided in the bush 4*a* of the master template 4 and opening radially onto its exterior surface,
- a plurality of locking elements 15 mounted to slide radially in a radial direction II-II in a transverse passage 16 immobile relative to the casing 2, movable between an engagement position (FIG. 2) in which said locking elements 15 are partially engaged in said radial female housings 14 whilst remaining guided in said transverse passages 16, and a release position (FIGS. 3 to 5) in which said locking elements 15 are outside said radial female housings 14,
- the first spring-loading means 13 continuously urging said locking element 15 toward its engagement position (FIG. 2).

The transverse passages 16 are formed in an annular ring 20 that is immobile relative to the casing 2.

Figure 7:
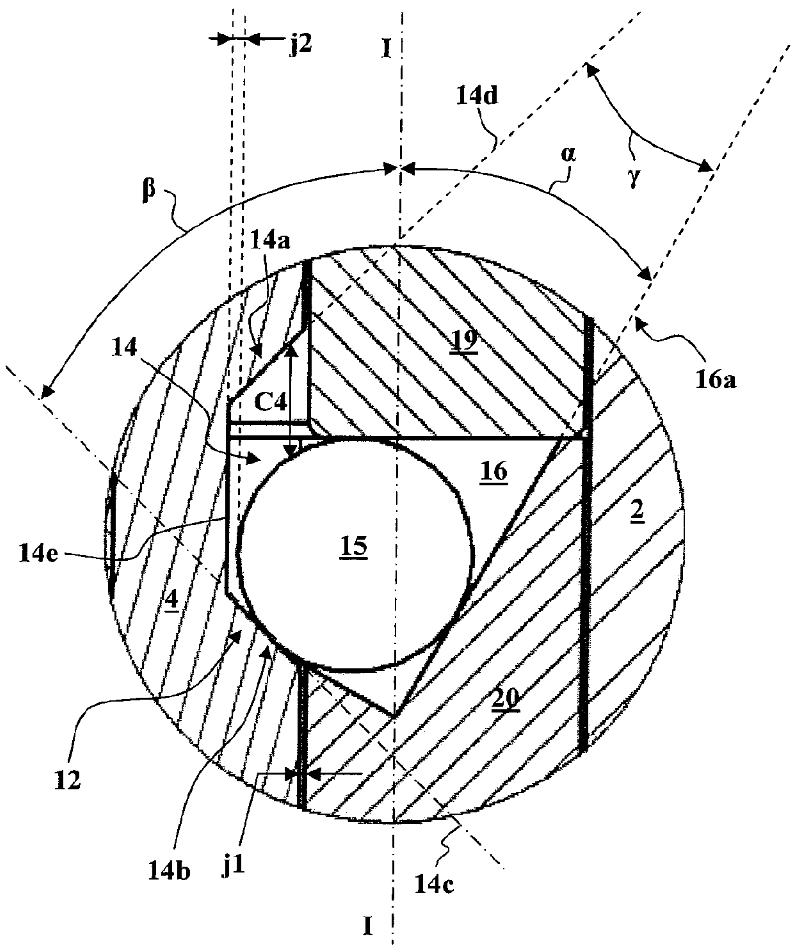
FIG. 7 is a detail view of the FIG. 2 tapping unit.

Here it is seen more particularly in FIGS. 2 to 6 that:

- the locking elements 15 are spherical balls,
- the transverse passages 16 respectively include a portion with a first oblique slope 16*a* relative to the axial direction I-I of movement of the tap 7 (FIG. 7).

The first spring-loading means 13 urge the locking elements 15 in the axial direction I-I against the portion with the first oblique slope 16*a* via an annular ring 19. The portion with the first oblique slope 16*a* is oriented in such a manner as to move the locking elements 15 radially into an engagement position as a result of the axial loading of the first spring-loading means 13. To this end, the portion with the first oblique slope 16*a* is at an angle α of approximately 30° to the axial direction I-I of movement of the tap 7 (FIG. 7).

It is seen more particularly in FIG. 7 that the radial female housings 14 extend in the axial direction I-I of movement of the tap 7 between a proximal end 14*a* and a distal end 14*b* and have, at their distal end 14*b*, a second slope 14*c* oblique relative to the axial direction I-I of movement of the tap 7. The second oblique slope 14*c* is oriented in such a manner as to move the locking elements 15 out of the radial female housing 14 when the master template 4 is moved toward the first proximal retraction position. To this end, the second oblique slope 14*c* is at an angle β of approximately 45° to the axial direction I-I of movement of the tap 7.

The values of the angles α and β and the stiffness of the first spring-loading means 13 (which here consist of a coil spring) may be adapted as a function of the retaining force that it is wished to apply to the master template 4 and as a function of the force from which it is wished to move the master template 4 beyond the first proximal retraction position without any axial loading being exerted on the tap 7.

Good results have been obtained by choosing first spring-loading means 13 and angles α and β in such a manner that the master template 4 may be moved beyond its reference position only by an axial force exerted on the tap 7 greater than approximately 600 N. The tap 7 is thus retained with a sufficient retaining force to effect the tapping.

To prevent the risk of breaking the tap 7, good results have been obtained by choosing first spring-loading means 13 and angles α and β in such a manner that the master template 4 is moved beyond the first proximal retraction position when an axial force greater than approximately 730 N is applied to the tap 7.

Figure 6:
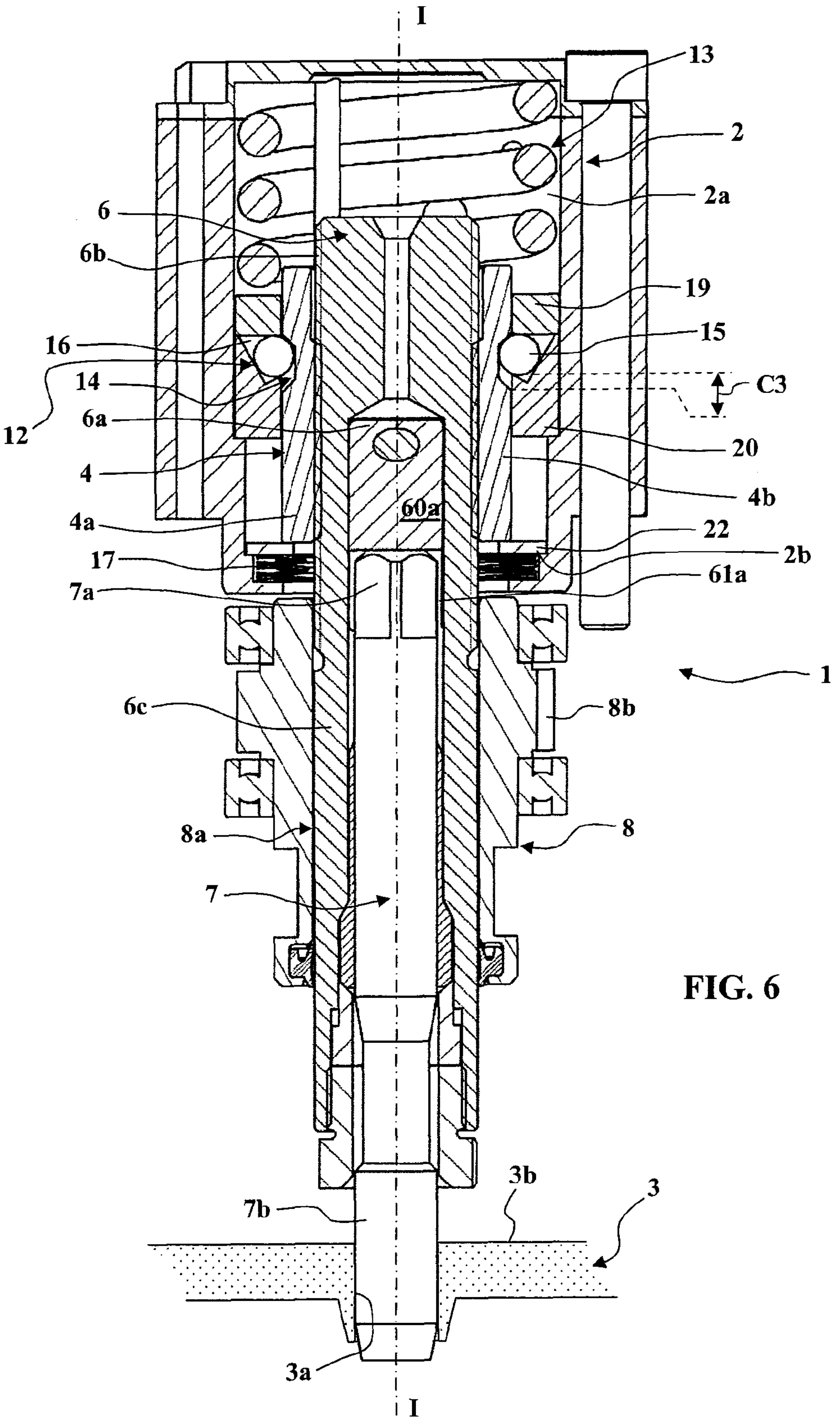
FIG. 6 is a sectional view of the FIG. 1 tapping unit in the second diametral direction, the master template being in its distal forward position.

It is seen more particularly in FIGS. 6 and 7 that the protection means 12 also allow limited forward axial movement of the tap 7 toward the exterior of the casing 2 against the action of second spring-loading means 17 from the reference position to a distal forward position over a particular forward stroke C3. This enables the tap 7 to track unintentional movements of the workpiece 3 to be machined without this damaging the tap 7 and/or the thread that is being produced.

It is seen more particularly in FIG. 7 that to enable this particular forward stroke C3 the radial female housings 14 are elongate in the axial direction I-I of movement of the tap 7 in such a manner as to allow an axial movement stroke C4 of the locking elements 15 in the radial female housings 14. The axial movement stroke C4 is substantially equal to the particular forward stroke C3.

To limit the particular forward stroke C3, the radial female housings 14 have, at their proximal end 14*a*, a third slope 14*d* oblique relative to the axial direction I-I of movement of the tap 7. The third oblique slope 14*d* is oriented in such a manner that, in the distal forward position (FIG. 6), it cooperates with the first oblique slope 16*a* to lock the locking elements 15 in their engagement position.

The third oblique slope 14*d* may advantageously be substantially parallel to the first oblique slope 16*a* and/or substantially perpendicular to the second oblique slope 14*c*.

In the embodiment shown in FIGS. 1 to 8, it is more particularly seen in FIG. 7 that the third oblique slope 14*d* and the first oblique slope 16*a* are at an acute angle γ. At the end of the particular forward stroke C3, the locking means 15 are thus held pressed into their engagement position by a wedging effect through cooperation of the first oblique slope 16*a* and the third oblique slope 14*d*.

In practical terms, the second oblique slope 14*c* and the third oblique slope 14*d* may be produced by machining radial female housings 14 opening radially onto the exterior surface of the bush 4*a* of the master template 4 by way of a chamfer bearing the second oblique slope 14*c* and the third oblique slope 14*d*.

In the case of a small eccentricity of the hole 3*a* to be tapped relative to the axial direction I-I, to enable the tap 7 to be engaged in a hole 3*a* to be tapped means are provided to allow small limited radial movement of the tap 7 in the casing 2 about a radial mean position. Here, the radial mean position is that in which the tap 7 is centered relative to the axial direction I-I. It is seen more particularly in FIGS. 7 and 8 that, to allow the small radial movement of the tap 7, radial clearances j1, j2 and j3 are provided. The radial clearance j1 is situated between the annular ring 20 and the master template 4. The radial clearance j2 is provided between the locking elements 15 and the bottom 14*e* of the radial female housings 14. The radial clearing j3 is provided between the drive shaft 8 and the driving section 6*c* of the tap-holder 6.

Via the locking elements 15, the first oblique slope 16*a* and the second oblique slope 14*c*, the first spring-loading means 13 urge the tap 7 into its radial mean position centered relative to the axial direction I-I.

The operation of the tapping unit 1 of the invention is explained in more detail hereinafter by means of FIGS. 2 to 6.

Before the tap 7 is driven in rotation in the axial direction I-I, its distal end 7*b* is flush with the hole 3*a* to be tapped. In the situation represented in FIGS. 2 to 5, the hole 3*a* to be tapped is eccentric relative to the axial direction I-I with the result that the tap 7 cannot be engaged in the hole 3*a* to be tapped.

The drive shaft 8 is then driven in rotation in the axial direction I-I by a mechanical transmission actuated by a motor. Via the keys 10*a* to 10*d*, the drive shaft 8 drives the tap-holder 6 and thus the tap 7. Because of the coil connection between the tap-holder 6 and the master template 4, the tap 7 moves forward toward the outside of the casing 2 with a movement indicated by the arrow 11 and abuts on the upper surface 3*b* of the workpiece 3 to be machined. The tap 7 fails to penetrate into the hole 3*a* to be tapped, the latter being too eccentric relative to the axial direction I-I for the means allowing limited radial movement of the tap 7 to enable this eccentricity to be compensated.

Under the driving effect of the drive shaft 8, the tap 7 and the tap-holder 6 continue their rotation movement in the axial direction I-I but remain immobile in translation in the axial direction I-I relative to the casing 2: the tap 7 "skates" against the upper surface 3*b*. The master template 4 is then moved from its reference position (FIG. 2) toward its first proximal retraction position (FIG. 3) over the first particular penetration stroke C1.

This movement of the master template 4 is allowed by the progressive movement of the locking elements 15 out of the radial female housings 14 and by the progressive compression of the first spring-loading means 13.

Once the master template 4 is in the first proximal retraction position (FIG. 3), if it is still impossible to engage the tap 7 in the hole 3*a* to be tapped, by virtue of the axial force exerted by the first spring-loading means 13, the master template is moved beyond the first proximal retraction position toward the second proximal retraction position (FIGS. 4 and 5).

During the movement of the master template 4 between the first proximal retraction position and the second proximal retraction position, the locking elements are outside the radial female housings 14 and bear against the cylindrical outside surface of the bush 4*a* of the master template 4. As a result, the spring-loading means 13 are automatically disengaged or inhibited, in the sense that they no longer apply a high axial force to the tap 7, or even any such force at all. The movement of the master template 4 over the second particular penetration stroke C2 is effected only against a friction force between the locking elements 15 and the bush 4*a* of the master template 4, which force is very low.

While it is moving, the master template 4 is not moved in rotation relative to the casing 2, which preserves the tapping settings.

It is seen more particularly in FIGS. 1 and 2 to 5 that the tapping unit 1 includes means 18 for detecting movement of the master template 4 beyond the first proximal retraction position. Here, the detection means 18 include an axial rod 18*a* connected by its distal end 180*a* to the master template 4 and having its distal end 180*b* projecting out of the casing 2 (FIG. 1). During movement of the master template 4 to its second proximal retraction position, the projection of the axial rod 18*a* out of the casing 2 increases to a maximum projection position shown in FIG. 5. The axial rod 18*a* may be used to actuate means for alerting the operator and/or means for shutting down the production line.

The axial rod 18*a* may further be used as means for replacement of the master template 4 in the reference position by applying a thrust to the axial rod 18*a* according to the movement shown by the arrow 21 (FIG. 5).

Alternatively, to return the master template 4 into its reference position it is possible to drive the drive shaft 8 in the opposite direction about the axial direction I-I. The tap-holder 6, also driven in reverse rotation in the axial direction I-I, thus drives the master template 4 toward its reference position via its threaded connection with the master template 4.

Good results have been obtained by providing a first penetration stroke C1 of approximately 2.5 mm and a second penetration stroke C2 of approximately 17.5 mm, which produces a distance of approximately 20 mm between the reference position and the second proximal position of the master template 4.

Such a first penetration stroke C1 enables the tap 7 to be engaged in the hole 3*a* to be tapped in the case of a small defect in the centering of the latter relative to the axial direction I-I without exerting stresses on the tap 7 that could lead to it breaking.

Such a distance of approximately 20 mm between the reference position and the second proximal retraction position protects the tap 7 in most tapping applications, the majority of tapping applications using a tapping stroke less than or equal to 20 mm.

If the tap 7 has been engaged in the hole 3*a* to be tapped, it may be that the workpiece 3 to be tapped is subjected to unintentional movements tending to move the tap 7 toward the outside of the casing 2. It is seen more particularly in FIG. 6 that in this case the master template 4 may be moved from its reference position into a distal forward position over the particular forward stroke C3 against the action of the second spring-loading means 17, which are thus compressed via an annular ring 22.

The third oblique slope 14*d* and the first oblique slope 16*a* interrupt the movement of the master template 4, for example after a forward stroke C3 of approximately 2 mm. Alternatively or in addition to this, the forward stroke C3 may be limited by the annular ring 22 coming to abut indirectly against the casing 2 via the second spring-loading means 17 at the end of compression, or coming to abut directly against a shoulder 2*b* of the casing 2 (FIG. 6).

The present invention is not limited to the embodiments that have been explicitly described, but includes diverse variants and generalizations thereof contained within the scope of the following claims.

The invention claimed is:

1. A tapping unit (1), comprising:

a casing (2) intended to be fixed in front of a workpiece (3) to be machined on a support of a machine tool, and having an interior housing (2*a*), a master template (4), including a bush (4*a*) with a threaded bore (4*b*), axially engaged to slide inside the interior housing (2*a*) of the casing (2), locking means (5), preventing the master template (4) from rotating inside the interior housing (2*a*) of the casing (2), a tap-holder (6), including means (6*a*) for receiving and retaining a tap (7), provided with a threaded section (6*b*) functionally engaged in the threaded bore (4*b*) of the master template (4), and including a driving section (6*c*), a rotatably mounted drive shaft (8), including a bore (8*a*) receiving in longitudinal sliding the drive section (6*c*) of the tap-holder (6), and loaded in rotation by a mechanical transmission actuated by a motor, protection means (12) for allowing axial retraction movement of the master template (4) toward the interior of the casing (2) from a reference position to a first proximal retraction position over a first particular penetration stroke (C1) over which first spring-loading means (13) continuously urge the master template (4) toward its reference position, wherein the protection means (12) further allow a supplementary retraction axial movement of the master template (4) toward the interior of the casing (2) from the first proximal retraction position to a second proximal retraction position over a second particular penetration stroke (C2) over which the master template (4) is no longer urged toward the exterior of the casing (2).

2. The tapping unit (1) as claimed in claim 1, wherein the protection means (12) comprise:

at least one radial female housing (14) provided in the bush (4*a*) of the master template (4) and opening radially onto its exterior surface, at least one locking element (15) mounted to slide radially in a transverse passage (16) immobile relative to the casing (2), movable between an engagement position in which said locking element (15) is partially engaged in said radial female housing (14) whilst remaining guided in said transverse passage (16), and a release position in which said locking element (15) is outside said radial female housing (14), the first spring-loading means (13) continuously urging said locking element (15) directly or indirectly toward its engagement position.

3. The tapping unit (1) as claimed in claim 1, wherein:

the locking element (15) is a spherical ball, the transverse passage (16) includes a portion with a first oblique slope (16*a*) relative to the axial direction (I-I) of movement of the tap (7), the first spring-loading means (13) urge the locking element (15) in the axial direction (I-I) against the portion with the first oblique slope (16*a*), the portion with the first oblique slope (16*a*) is oriented in such a manner as to move the locking element (15) radially into an engagement position as a result of the axial loading of the first spring-loading means (13).

4. The tapping unit (1) as claimed in claim 3, wherein the first oblique slope (16*a*) is at an angle (α) of approximately 30° to the axial direction (I-I) of movement of the tap (7).

5. The tapping unit (1) as claimed in claim 3, wherein:

the radial female housing (14) extends in the axial direction (I-I) of movement of the tap (7) between a proximal end (14*a*) and a distal end (14*b*) and has, at its distal end (14*b*), a second slope (14*c*) oblique relative to the axial direction (I-I) of movement of the tap (7), the second oblique slope (14*c*) is oriented in such a manner as to move the locking element (15) out of the radial female housing (14) when the master template (4) is moved toward the first proximal retraction position.

6. The tapping unit (1) as claimed in claim 5, wherein the second oblique slope (14*c*) is at an angle (13) of approximately 45° to the axial direction (I-I) of movement of the tap (7).

7. The tapping unit (1) as claimed in claim 1, wherein the first spring-loading means (13) are dimensioned in such a manner that the master template (4) can be moved beyond the reference position only by an axial force exceeding approximately 600 N.

8. The tapping unit (1) as claimed in claim 1, wherein the first spring-loading means (13) are dimensioned in such a manner that the master template (4) can be moved beyond the first proximal retraction position only by an axial force exceeding approximately 730 N.

9. The tapping unit (1) as claimed in claim 1, wherein the reference position and the first proximal retraction position are approximately 2.5 mm apart.

10. The tapping unit (1) as claimed in claim 1, wherein the reference position and the second proximal retraction position are approximately 20 mm apart.

11. The tapping unit (1) as claimed in claim 1, wherein the protection means (12) allow limited forward axial movement of the master template (4) toward the exterior of the casing (2) against second spring-loading means (17) from the reference position to a distal forward position over a particular forward stroke (C3).

12. The tapping unit (1) as claimed in claim 11, wherein the radial female housing (14) is elongate in the axial direction (I-I) of movement of the tap (7) in such a manner as to allow an axial movement stroke (C4) of the locking element (15) in the radial female housing (14), preferably of approximately 2 mm length.

13. The tapping unit (1) as claimed in claim 11, wherein:

the radial female housing (14) has, at its proximal end (14*a*), a third slope (14*d*) oblique relative to the axial direction (I-I) of movement of the tap (7), the third oblique slope (14*d*) is oriented in such a manner that, in the distal forward position, it cooperates with the first oblique slope (16*a*) to lock the locking element (15) in the engagement position.

14. The tapping unit (1) as claimed in claim 13, wherein the third oblique slope (14*d*) is substantially parallel to the first oblique slope (16*a*) and/or substantially perpendicular to the second oblique slope (14*c*).

15. The tapping unit (1) as claimed in claim 14, wherein the radial female housing (14) opens radially onto the exterior surface of the bush (4*a*) of the master template (4) via a chamfer bearing the second oblique slope (14*c*) and the third oblique slope (14*d*).

16. The tapping unit (1) as claimed in claim 1, including means (j1, j2, j3) for allowing small limited radial movement of the tap (7) in the casing (2) about a radial mean position.

17. The tapping unit (1) as claimed in claim 1, including means (18) for detecting movement of the master template (4) beyond the first proximal retraction position.

* * * * *